United States Patent
Koshino et al.

(10) Patent No.: US 7,447,237 B2
(45) Date of Patent: Nov. 4, 2008

(54) RADIO ACCESS NETWORK SYSTEM, RADIO COMMUNICATION METHOD, SYNCHRONOUS SERVER AND NODE

(75) Inventors: Masayuki Koshino, Fujisawa (JP); Mayu Yamada, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 792 days.

(21) Appl. No.: 10/724,829

(22) Filed: Dec. 2, 2003

(65) Prior Publication Data

US 2004/0109474 A1 Jun. 10, 2004

(30) Foreign Application Priority Data

Dec. 2, 2002 (JP) ............... 2002-349888

(51) Int. Cl.
*H04J 3/06* (2006.01)
(52) U.S. Cl. ...................... 370/503; 370/350
(58) Field of Classification Search .......... 370/324, 370/350, 503, 504, 505, 508, 509, 510, 512, 370/516
See application file for complete search history.

(56) References Cited

U.S. PATENT DOCUMENTS

| | | | |
|---|---|---|---|
| 4,815,110 A | | 3/1989 | Benson et al. |
| 5,751,721 A | * | 5/1998 | Bloks .................. 370/509 |
| 6,707,828 B1 | * | 3/2004 | Wolf .................. 370/503 |
| 6,868,094 B1 | * | 3/2005 | Bordonaro et al. ........ 370/516 |
| 6,983,161 B2 | * | 1/2006 | Wesby et al. ............ 455/502 |
| 6,985,499 B2 | * | 1/2006 | Elliot .................. 370/503 |
| 6,996,128 B2 | * | 2/2006 | Rabenko et al. .......... 370/503 |
| 7,000,031 B2 | * | 2/2006 | Fischer et al. ............ 709/248 |
| 7,079,554 B2 | * | 7/2006 | Peled .................. 370/514 |

(Continued)

FOREIGN PATENT DOCUMENTS

| | | |
|---|---|---|
| JP | 62-271540 | 11/1987 |
| WO | WO 00/42728 | 7/2000 |
| WO | WO 01/43325 | 6/2001 |

OTHER PUBLICATIONS

D. L. Mills, IEEE Transactions on Communications, vol. 39, No. 10, XP-000275311, pp. 1482-1493, "Internet Time Synchronization: The Network Time Protocol", Oct. 1, 1991.

(Continued)

*Primary Examiner*—Chi H. Pham
*Assistant Examiner*—Kevin Mew
(74) *Attorney, Agent, or Firm*—Oblon, Spivak, McClelland, Maier & Neustadt, P.C.

(57) ABSTRACT

An apparatus and method prevent an out-of-sync state of clocks from occurring in an IP network or an IP-based radio access network in which network fluctuation delays occur. A synchronous server includes a clock generator configured to periodically generate a clock and a synchronous message transmitter configured to generate a synchronous message for notifying information regarding the generated clock, and to transmit the generated synchronous message to the node using an IP packet. The node includes a time calculator configured to obtain a time of receiving the synchronous message and a clock correction processor configured to calculate a clock correction value in accordance with the time of receiving the synchronous message and the information regarding the clock notified by the synchronous message, and to correct a generated timing of a clock in the node in accordance with the clock correction value.

7 Claims, 4 Drawing Sheets

U.S. PATENT DOCUMENTS

| | | | | |
|---|---|---|---|---|
| 7,200,158 | B2* | 4/2007 | Gustin | 370/509 |
| 2002/0141452 | A1* | 10/2002 | Mauritz et al. | 370/503 |
| 2003/0035444 | A1* | 2/2003 | Zwack | 370/503 |
| 2003/0169777 | A1* | 9/2003 | Fuse | 370/516 |
| 2004/0062278 | A1* | 4/2004 | Hadzic et al. | 370/503 |
| 2006/0120294 | A1* | 6/2006 | Denney et al. | 370/241 |

OTHER PUBLICATIONS

A. Fasbender, et al., IEEE International Conference on Communications, vol. 1, XP-002124761, pp. 490-494, "On Assessing Unidirectional Latencies in Packet-Switched Networks", Jun. 8, 1998.

D. Mills, "Simple Network Time Protocol (SNTP)", Network Working Group, Aug. 1992, pp. 1-10.

* cited by examiner

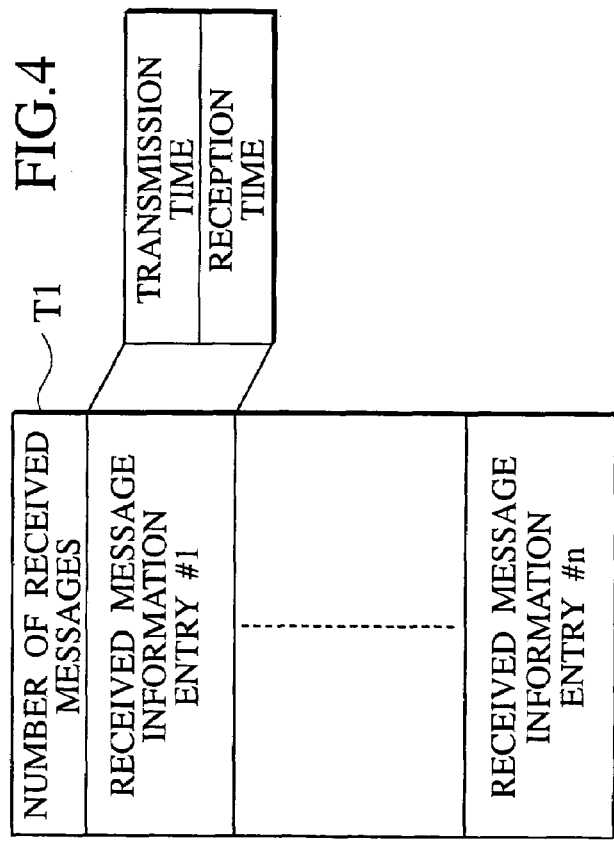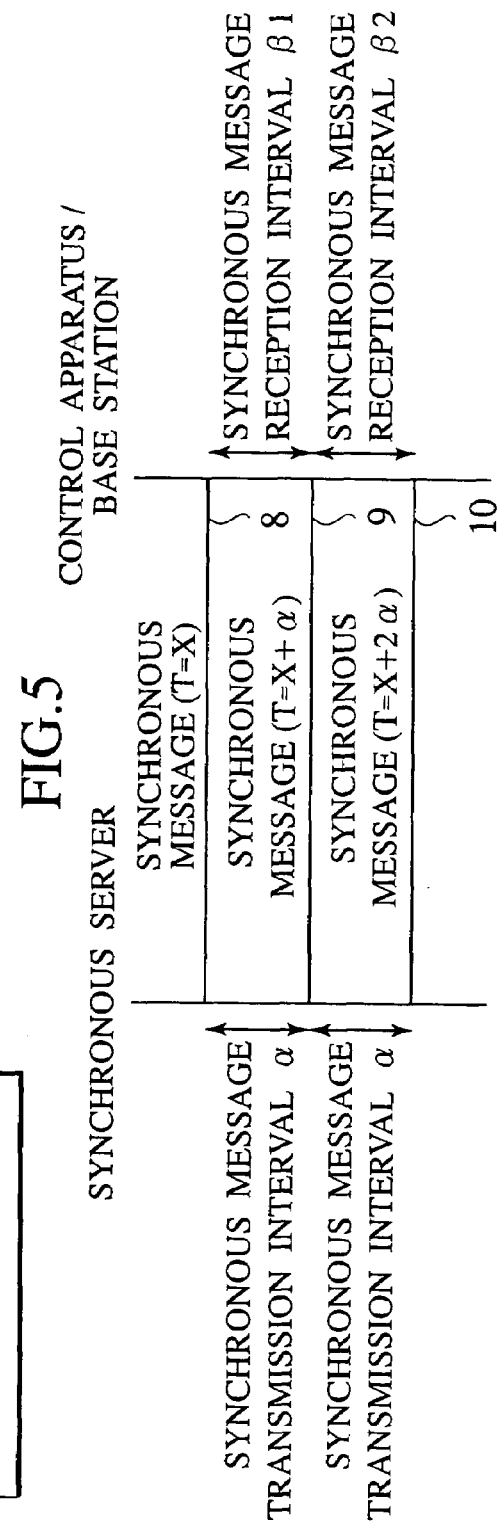

RADIO ACCESS NETWORK SYSTEM, RADIO COMMUNICATION METHOD, SYNCHRONOUS SERVER AND NODE

CROSS REFERENCE TO RELATED APPLICATION

This application is based upon and claims the benefit of priority from the prior Japanese Patent Application No. P2002-349888, filed on Dec. 2, 2002; the entire contents of which are incorporated herein by reference.

BACKGROUND OF THE INVENTION

1. Field of the Invention

The present invention relates to a radio access network system which includes a synchronous server and at least one node such as a base station and a control apparatus operated by a plurality of internal clocks, a radio communication method, a synchronous server and a node.

2. Description of the Related Art

Conventionally, an IP terminal which functions as a synchronous master connected to an IP network periodically transmits synchronous timing packets to an IP terminal which functions as a synchronous slave connected to an IP network. The synchronous slave determines a synchronous state based on a difference between an assumed time of receiving the synchronous timing packets and an actual time of receiving the synchronous timing packets, so as to synchronize a clock of the synchronous slave with a clock of the synchronous master.

Specifically, the conventional IP terminal which functions as the synchronous master transmits the synchronous timing packets to the IP terminal which functions as the synchronous slave at fixed transmission intervals. Clock synchronization is carried out based on a clock counter value during transmission/reception of the synchronous timing packets.

However, the aforementioned synchronization system does not include an IP-based radio access network including a base station and a control apparatus as its application environment, so that the base station and the control apparatus cannot be synchronized with each other in the radio access network, and the out-of-sync state causes an excess or a shortage of transmission/reception data. As a result, a means for solving this problem becomes necessary, and a processing load is increased in order to solve this problem.

According to the synchronization system, the IP terminal is being used as the synchronous master, making it impossible to continuously carry out concentrated control, and possibly causing a stable synchronization processing operation to become difficult.

Furthermore, when a network fluctuation transmission delay occurs between the synchronous master and the synchronous slave, there has been a problem in that an out-of-sync state of the clock occurs between the synchronous master and the synchronous slave due to the influence of the network fluctuation transmission delay in the aforementioned synchronization system.

That is, the synchronous master transmits a synchronous message (a synchronous timing packet) to each of the synchronous slaves in the conventional synchronization system. However, the arrival of the synchronous message at the synchronous slave is delayed depending on a communication state or a communication path, and the delay has been determined as an out-of-sync state of clock irrespective of the fact that the delay is caused by a communication environment. Consequently, it has been difficult to set proper synchronization.

BRIEF SUMMARY OF THE INVENTION

In view of the foregoing, it is an object of the present invention to provide a radio access network system capable of properly synchronizing clocks even in an IP network or an IP-based radio access network in which a network fluctuation transmission delay occurs, a radio communication method, a synchronous server and a node device corresponding to the same.

A first aspect of the present invention is summarized as a radio access network system having a synchronous server and at least one node. The synchronous server includes a clock generator configured to periodically generate a clock; and a synchronous message transmitter configured to generate a synchronous message for notifying information regarding the generated clock, and to transmit the generated synchronous message to the node using an IP packet. The node includes a time calculator configured to obtain a time of receiving the synchronous message; and a clock correction processor configured to calculate a clock correction value in accordance with the time of receiving the synchronous message and the information regarding the clock notified by the synchronous message, and to correct a generated timing of a clock in the node in accordance with the clock correction value.

A second aspect of the present invention is summarized as a radio communication method in a radio access network system having a synchronous server and at least one node. The method includes the steps of (A) generating a clock periodically in the synchronous server; (B) generating a synchronous message for notifying information regarding the generated clock in the synchronous server; (C) transmitting the generated synchronous message to the node using an IP packet in the synchronous server; (D) calculating a clock correction value in accordance with the time of receiving the synchronous message and the information regarding the clock notified by the synchronous message in the node; and (E) correcting a generated timing of a clock in accordance with the clock correction value in the node.

A third aspect of the present invention is summarized as a synchronous server in a radio access network system having at least one node. The server includes a clock generator configured to periodically generate a clock; and a synchronous message transmitter configured to generate a synchronous message for notifying information regarding the generated clock, and to transmit the generated synchronous message to the node using an IP packet.

In the third aspect, the synchronous message transmitter may set a time of transmitting the synchronous message as the information regarding the clock in the synchronous message.

A fourth aspect of the present invention is summarized as a node in a radio access network system having a synchronous server. The node includes a receiver configured to receive a synchronous message for notifying information regarding a clock generated in the synchronous server; a time calculator configured to obtain a time of receiving the synchronous message; and a clock correction processor configured to calculate a clock correction value in accordance with the time of receiving the synchronous message and the information regarding the clock notified by the synchronous message, and to correct a generated timing of a clock in the node in accordance with the clock correction value.

In the fourth aspect, the time calculator may measure a reception interval of the synchronous message, and may calculate the clock correction value without using the synchronous message when the reception interval of the synchronous message is more than a predetermined threshold.

In the fourth aspect, the node may further include a memory configured to associate a time of transmitting set in the synchronous message with the time of receiving the synchronous message in the node, upon receiving the synchronous message.

In the fourth aspect, the time calculator may obtain the time of transmitting the synchronous message and the time of receiving the synchronous message from the memory, may calculate a transmission interval of the synchronous message and a reception interval of the synchronous message, and may calculate the clock correction value in accordance with a comparison between the transmission interval and the reception interval.

BRIEF DESCRIPTION OF THE SEVERAL VIEWS OF THE DRAWINGS

FIG. 4 is an explanatory view illustrating a data structure of a synchronous message of the embodiment.

FIG. 5 is a sequential view showing an example of a clock synchronization control procedure between the synchronous server and the control apparatus/base station as the nodes in the radio access network of the embodiment.

DETAILED DESCRIPTION OF THE INVENTION

Referring to FIGS. 1 to 4, a radio access network system according to an embodiment of the present invention will be described in detail.

(Configuration of Radio Access Network System)

Figure 1:
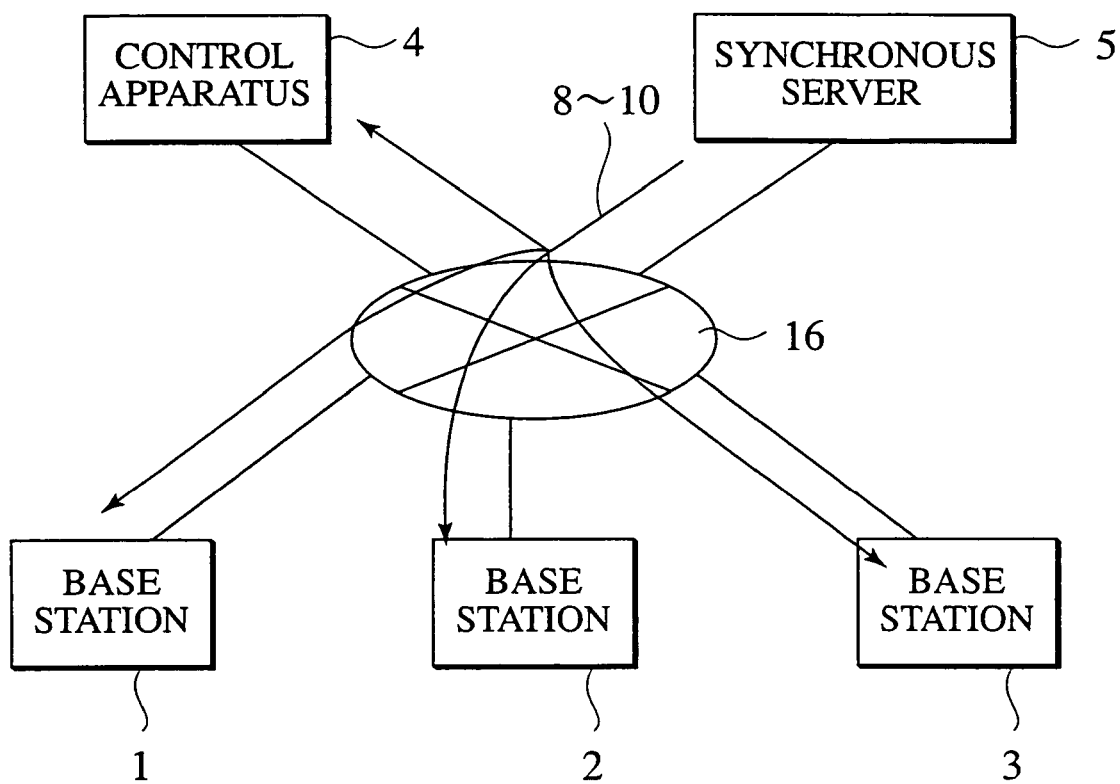
FIG. 1 is an explanatory view illustrating an example of network configuration of a radio access network of an embodiment.

FIG. 1 illustrates a configuration of a radio access network of the embodiment. The embodiment will be described by means of an example in which three synchronous messages are periodically transmitted from a synchronous server 5.

As shown in FIG. 1, the radio access network system of the embodiment includes base stations 1 to 3, a control apparatus 4, and the synchronous server 5, which are connected through an IP network 16.

Synchronous messages 8 to 10 are transmitted/received between the synchronous server 5 and a plurality of nodes such as the base stations 1 to 3, the control apparatus 4 or the like, so as to set clock synchronization between the plurality of nodes such as the control apparatus 4, the base stations 1 to 3 or the like in the IP network 16.

For example, as shown in FIG. 5, each of the nodes 1 to 4 which has received the synchronous messages is configured to measure reception intervals $\beta 1$, $\beta 2$ of the synchronous messages based on the clocks of each of the nodes 1 to 4.

Each of the nodes 1 to 4 is configured to compare an average value $\beta=(\beta 1+\beta 2)/2$ of these reception intervals with a transmission interval $\alpha$ of the synchronous message.

In the case of $\alpha>\beta$, each of the nodes 1 to 4 is configured to determine that a clock of the node is behind a clock of the synchronous server 5, and to advance the clock of the node by a corresponding amount.

In the case of $\alpha<\beta$, each of the nodes 1 to 4 is configured to determine that the clock of the node is ahead of the clock of the synchronous server 5, and to put the clock of the node back by a corresponding amount.

In the case of $\alpha=\beta$, each of the nodes 1 to 4 is configured to determine that the clocks of the node and the synchronous server 5 are not out-of-sync.

(Constitution of Synchronous Server)

Figure 2:
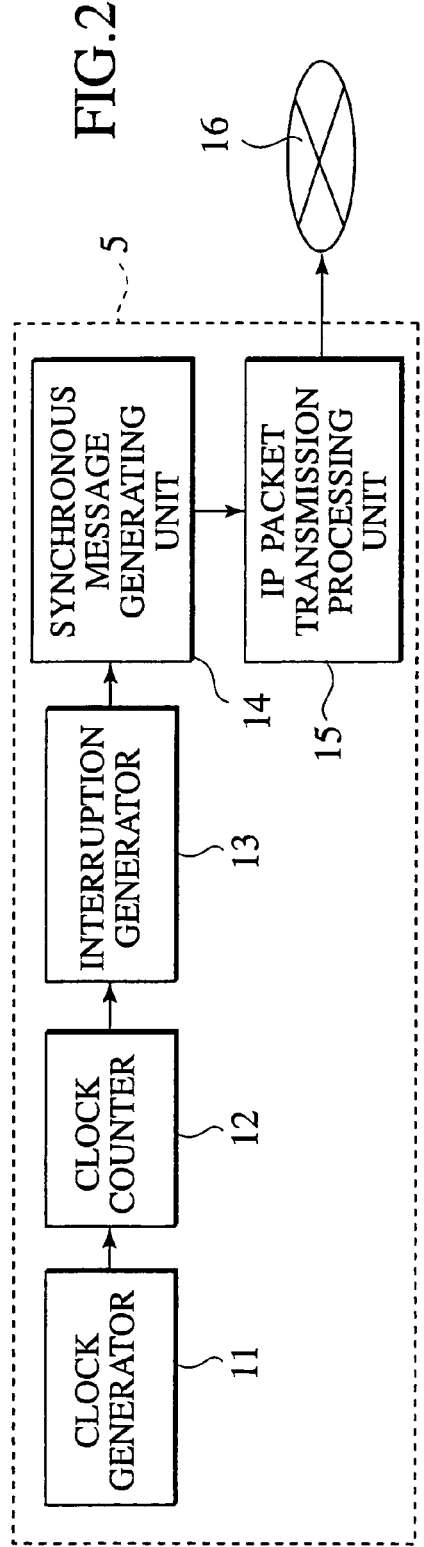
FIG. 2 is a block diagram showing a functional constitution of a synchronous message transmission function of a synchronous server of the embodiment.

A constitution of the synchronous server 5 will be described. FIG. 2 is a block diagram showing an internal constitution of the synchronous server 5.

As shown in FIG. 2, the synchronous server 5 is configured with a clock generator 11, a clock counter 12, an interruption generator 13, a synchronous message generating unit 14, and an IP packet transmission processing unit 15.

The clock generator 11 is a module for generating a clock at a predetermined cycle. The generated clock is inputted to the clock counter 12.

The clock counter 12 is a module for counting the number of clocks inputted from the clock generator 11. The clock counter 12 is configured to output a trigger signal to the interruption generator 13, in accordance with a predetermined synchronous message cycle, the number of synchronous messages transmitted in one synchronous message cycle, and a transmission interval of the synchronous message (a synchronous message transmission interval). The synchronous message notifies information regarding the clock generated by the clock generator 11.

The interruption generator 13 is a module for outputting a clock counter value when the trigger signal is inputted from the clock counter 12 and an interruption trigger signal indicating a synchronous message transmission instruction to the synchronous message generating unit 14, in accordance with the trigger signal.

The synchronous message generating unit 14 is a module for generating the synchronous messages 8 to 10. The synchronous message generating unit 14 is configured to set the clock counter value, which has been set in the interruption trigger signal as a time of transmitting the synchronous message, in the synchronous message.

The synchronous message generating unit 14 is configured to output the generated synchronous message and a transmission request to the IP packet transmission processing unit 15.

The IP packet transmission processing unit 15 is a module for transmitting the synchronous message to each node in accordance with the transmission request. The synchronous message is transmitted using an IP packet.

In the embodiment, destination IP addresses of the synchronous messages are set as broadcast addresses, the synchronous messages are transmitted to all the nodes in the IP network 16 by broadcast communication. For example, the synchronous messages can be transmitted as IP packets of the highest IP priorities through the IP network 16.

(Constitution of Node)

Figure 3:
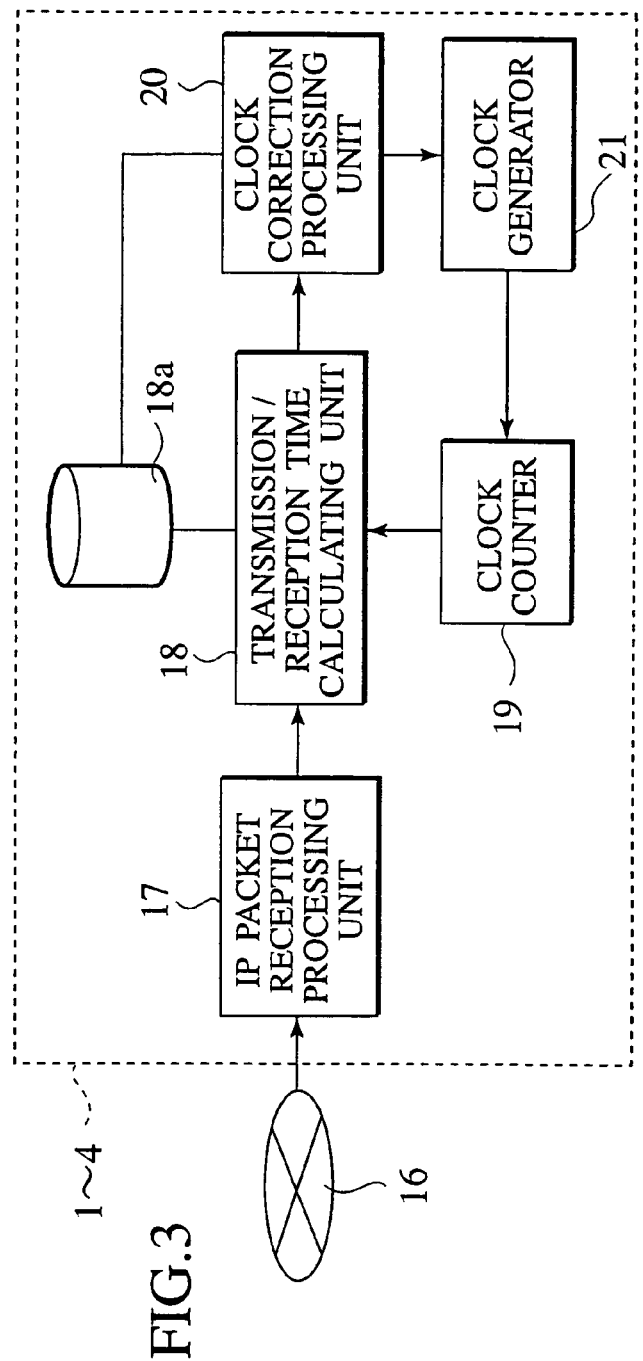
FIG. 3 is a block diagram showing a functional constitution of a synchronous message reception function of a node in the radio access network of the embodiment.

A constitution of a node such as the base stations 1 to 3, the control apparatus 4 or the like in the radio access network will be described. FIG. 3 is a block diagram showing the constitution of each of the nodes 1 to 4.

As shown in FIG. 3, each of the nodes 1 to 4 includes an IP packet reception processing unit 17, a transmission/reception time calculating unit 18, a clock counter 19, a clock correction processing unit 20, a clock generator 21, and a memory 18a.

The IP packet reception processing unit 17 is a module for receiving an IP packet from the synchronous server 5 through the IP network 16, and determining a message type of the received IP packet. When the message type of the received IP packet is a synchronous message, the IP packet reception processing unit 17 outputs the received synchronous message to the transmission/reception time calculating unit 18.

The transmission/reception time calculating unit 18 is a module for reading a clock counter value from the clock counter 19 at the time of receiving the synchronous message, so as to obtain a time of receiving the synchronous message (a reception time). The transmission/reception time calculating unit 18 is a module for obtaining a time of transmitting the synchronous message (a transmission time) from the clock counter value set in each of the received synchronous messages.

The transmission/reception time calculating unit 18 is a module for outputting a start trigger signal to the clock correction processing unit 20, when the number of received messages in a synchronous message information table T1 stored in the memory 18a has reached a predetermined number.

The transmission/reception time calculating unit 18 is configured to add "1" to the number of received messages in the synchronous message information table T1, so as to update the synchronous message information table T1, upon receiving a synchronous message.

To be more specific, the transmission/reception time calculating unit 18 accesses the received message information entry #n relevant to the number of the received messages in the synchronous message information table T1, upon receiving the synchronous message. Then the transmission/reception time calculating unit 18 writes the obtained reception time and the obtained transmission time in the received message information entry #n.

The memory 18a is a recording device such as a nonvolatile memory and a hard disk for storing the synchronous message information table T1.

As shown in FIG. 4, the synchronous message information table T1 has an area in which the number of received synchronous messages is written, and an area in which the received message information entries #1 to #n relevant to the respective received synchronous messages are written.

The transmission time and the reception time of each of the synchronous messages are written in each of the received message information entries #1 to #n.

The clock correction processing unit 20 is a module for calculating a clock correction value in accordance with the reception time obtained by the transmission/reception time calculating unit 18 and information regarding the clock of the synchronous server 5 notified by the synchronous message.

The clock correction processing unit 20 is configured to correct a generated timing of a clock in the node in accordance with the calculated clock correction value.

Specifically, the clock correction processing unit 20 refers to the synchronous message information table T1 stored in the memory 18a, so as to scan the received message information entries #1 to #n corresponding to the number of received synchronous messages from the first.

The clock correction processing unit 20 calculates transmission time differences (transmission intervals of the synchronous messages) Tx_dif and reception time differences (reception intervals of the synchronous messages) Rx_dif for the received message information entries #1 and #2, #2 and #3, and #n−1 and #n, so as to calculate an average value $\alpha$ of the transmission time differences Tx_dif and an average value $\beta$ of the reception time differences Rx_dif.

When a result of the calculation is $\alpha > \beta$, the clock generator 21 is instructed to shorten a 1 clock time by $((\alpha-\beta)/\beta)/m$. Here, m denotes the number of clocks equivalent to a predetermined 1 clock counter time of the clock counter 19.

On the other hand, when a result of the calculation is $\alpha < \beta$, the clock generator 21 is instructed to prolong a 1 clock time by $((\beta-\alpha)/\beta)/m$.

When a result of the calculation is $\alpha=\beta$, nothing is instructed to the clock generator 21.

That is, the clock correction processing unit 20 is configured to calculate a transmission interval of the synchronous message and a reception interval of the synchronous message, and to calculate the clock correction value in accordance with a comparison between the transmission interval and the reception interval.

The clock correction processing unit 20 includes a filter function for determining that delay fluctuation is large in the network and invalidating the Tx_dif and the Rx_dif between the received message information entries, when a difference between the Tx_dif and the Rx_dif is larger than a predetermined threshold.

That is, the clock correction processing unit 20 is configured to calculate the clock correction value without using the synchronous message when the reception interval of the synchronous message is more than a predetermined threshold.

The clock generator 21 is a module for changing (correcting) a clock time based on an instruction from the clock correction processing unit 20.

(Operation of Radio Access Network System)

The radio access network system configured in the foregoing manner is operated as performed follows.

FIG. 5 is a sequential view showing an outline of synchronous message transmission between the synchronous server 5 and the nodes such as the base stations 1 to 3, the control apparatus 4 or the like.

Figure 6:
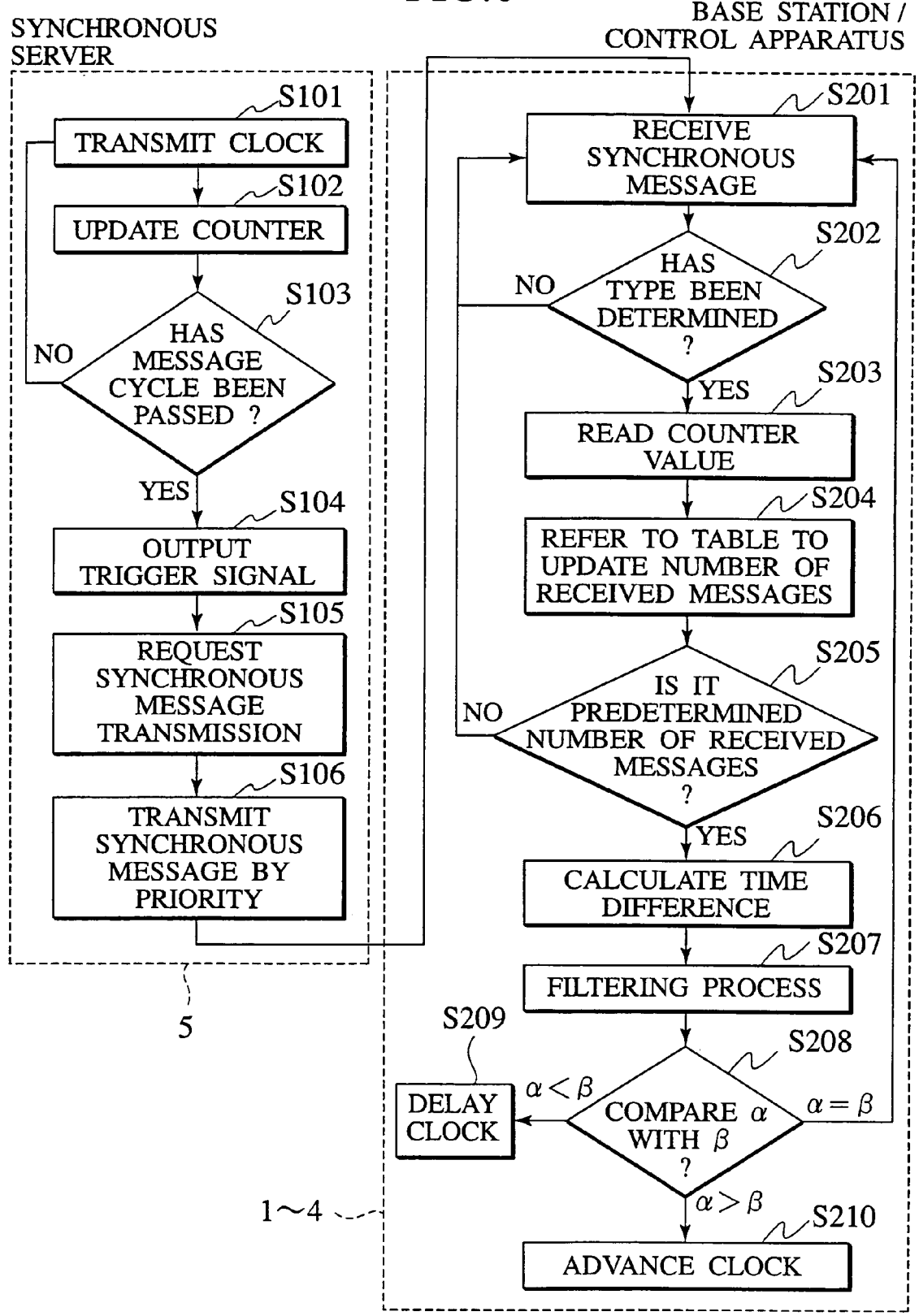
FIG. 6 is a flowchart showing operations of the synchronous server and the control apparatus/base station as the nodes in the radio access network of the embodiment.

FIG. 6 is a flowchart showing processing operations in the synchronous server 5 and the nodes such as the base stations 1 to 3, the control apparatus 4 or the like.

As shown in FIG. 5, first, the synchronous server 5 transmits three synchronous messages 8 to 10 to the nodes 1 to 4 in the radio access network (the IP network 16) by broadcasting at a transmission interval $\alpha$ at a given periodic transmission time X.

In this case, the synchronous messages to which the transmission time and the highest priority are added are transmitted.

Routers and the nodes 1 to 4 perform a reception process and a transmission process for the synchronous messages before other IP packets based on the set priority in the radio access network.

A synchronous message transmission function process in the synchronous server 5 and a synchronous message reception function process in the respective nodes such as the base stations 1 to 3, the control apparatus 4 or the like in the radio access network when the synchronous messages are transmitted or received are as follows.

As shown in FIG. 6, in step S101, the clock generator 11 of the synchronous server 5 generates a clock, so as to transmit the generated clock to the clock counter 12.

In step S102, the clock counter 12 updates a counter at a predetermined cycle, upon receiving the clock from the clock generator 11.

In step S103, the clock counter 12 determines whether or not a predetermined synchronous message cycle has been completed each time the counter is updated.

If it is determined that the synchronous message cycle has been completed ("Yes" in step S103), a trigger signal is outputted to the interruption generator 13, in accordance with the predetermined number of synchronous messages and synchronous message transmission intervals, in step S104.

On the other hand, if it is determined that the message cycle has not been completed ("No" in step S103), the steps S101 and S102 are repeated by a loop process.

The interruption generator 13 outputs an interruption trigger signal indicating a clock counter value at the time of outputting the trigger signal from the clock counter 12 and a synchronous message transmission instruction to the synchronous message generating unit 14.

The synchronous message generating unit 14 generates a synchronous message in which the clock counter value set as the transmission time in the interruption trigger signal is set.

In step S105, the synchronous message generating unit 14 requests the IP packet transmission processing unit 15 to transmit the generated synchronous message at the highest priority by broadcasting.

In step S106, the IP packet transmission processing unit 15 transmits the synchronous message requested to be transmitted as an IP packet in which a destination IP address is a broadcast address and an IP priority is the highest through the IP network 16.

In step S201, the IP packet reception processing unit 17 of the node such as the base stations 1 to 3, the control apparatus 4 or the like receive the IP packet through the IP network 16.

In step S202, the IP packet reception processing unit 17 determines a message type of the received IP packet.

When the message type is the synchronous message ("Yes" in step S202), the received synchronous message is outputted to the transmission/reception time calculating unit 18.

In step S203, the transmission/reception time calculating unit 18 reads a clock counter value at the time of the input of the synchronous message from the clock counter 19.

In step S204, the transmission/reception time calculating unit 18 adds "1" to the number of received messages in the synchronous message information table T1 stored in the memory 18a, so as to update the synchronous message information table T1.

In step S204, the transmission/reception time calculating unit 18 accesses the received message information entry #n relevant to the number of received messages in the synchronous message information table T1.

The clock counter value read from the clock counter 19 and the clock counter value set in the received synchronous message are respectively set as a reception time and a transmission time in the reception information entry #n.

In step S205, the transmission/reception time calculating unit 18 determines whether the number of received messages of the synchronous message information table T1 has reached a predetermined threshold or not.

If the number of received messages has reached the predetermined threshold ("Yes" in step S205), a start trigger signal is transmitted to the clock correction processing unit 20.

In step S206, the clock correction processing unit 20 sequentially refers to the received message information entries equivalent to the number of received messages from the first received message information entry #1 in the synchronous message information table T1, upon receiving the start trigger signal from the transmission/reception time calculating unit 18.

The clock correction processing unit 20 calculates transmission time differences (a transmission interval of the synchronous message) Tx_dif and reception time differences (a reception interval of the synchronous message) Rx_dif for the received message information entries #1 and #2, #2 and #3, and #n−1 and #n.

In step S207, the clock correction processing unit 20 carries out a filtering function in accordance with a result of the calculation, so as to delete data outside a permissible range.

That is, if a difference between the Tx_dif and the Rx_dif is larger than a predetermined threshold, the clock correction processing unit 20 determines that delay fluctuation in the network is large and invalidates the Tx_dif and the Rx_dif between the received message information entries.

In step S208, the clock correction processing unit 20 calculates an average value $\alpha$ of the obtained transmission time differences Tx_dif and an average value $\beta$ of the obtained reception time differences Rx_dif in accordance with a result of the calculation selected in the filtering function, and compares $\alpha$ with $\beta$.

If $\alpha > \beta$ is determined in step S208, the clock generator 21 is instructed to shorten a 1 clock time by $((\alpha-\beta)/\beta)/m$, thereby advancing a clock in step S210.

On the other hand, if $\alpha < \beta$ is determined in step S208, the clock generator 21 is instructed to prolong a 1 clock time by $((\beta-\alpha)/\beta)/m$, thereby putting the clock back in step S209.

If $\alpha = \beta$ is determined in step S208, no instruction is made to the clock generator 21.

The clock generator 21 changes a clock time based on an instruction from the clock correction processing unit 20.

(Operation and Effect)

According to the radio access network system and the radio communication method of the foregoing embodiments, clocks can be synchronized through the synchronous messages among the nodes such as the base stations 1 to 3, the control apparatus 4 or the like in the radio access network, so that it is possible to prevent increases in processing delays and processing loads caused by clock deviation.

Especially, according to the embodiment, the filtering function by the transmission/reception time calculating unit 18 enables invalidation of a transmission/reception interval of synchronous messages in which delays occur due to a communication environment, so that it is possible to prevent synchronous message delays from adversely effecting the clock correction value.

Moreover, according to the embodiment, the information regarding the plurality of synchronous messages is accumulated in the memory 18a, and the clock correction value is calculated by using the transmission/reception time difference of the continuous synchronous messages, so that the clock correction value can be statistically calculated based on the accumulated information so as to enable stable clock correction.

According to the embodiment, the synchronization process is carried out by the synchronous server 5 disposed in the radio access network, the concentrated control can be continuously carried out, thus enabling stable execution of the synchronization process.

As described above, according to the present invention, it is possible to prevent increases in processing delays and processing loads caused by an out-of-sync state of clocks in the IP network or the IP-based radio access network in which network fluctuation delays occur.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A radio access network system having a synchronous server and at least one node, wherein
the synchronous server comprises:
a clock generator configured to periodically generate a clock; and
a synchronous message transmitter configured to generate a synchronous message for notifying information regarding the generated clock, and to transmit the generated synchronous message to the node using an IP packet; and
the node comprises:
a time calculator configured to obtain a time of receiving the synchronous message; and
a clock correction processor configured to calculate a clock correction value in accordance with the time of receiving the synchronous message and the information regarding the clock notified by the synchronous message, and to correct a generated timing of a clock in the node in accordance with the clock correction value,
wherein the time calculator is configured to measure a reception interval of the synchronous message, and the clock correction processor is configured to calculate, without using the synchronous message, the clock correction value when the reception interval of the synchronous message is more than a predetermined threshold.

2. A radio communication method in a radio access network system having a synchronous server and at least one node, the method comprising the steps of:
generating a clock periodically in the synchronous server;
generating a synchronous message for notifying information regarding the generated clock in the synchronous server;
transmitting the generated synchronous message to the node using an IP packet in the synchronous server;
calculating a clock correction value in accordance with a time of receiving the synchronous message and the information regarding the clock notified by the synchronous message in the node; and
correcting a generated timing of a clock in accordance with the clock correction value in the node;
wherein the calculating includes measuring a reception interval of the synchronous message, and calculating, without using the synchronous message, the clock correction value when the reception interval of the synchronous message is more than a predetermined threshold.

3. A synchronous server in a radio access network system having at least one node, the server comprising:
a clock generator configured to periodically generate a clock; and
a synchronous message transmitter configured to generate a synchronous message for notifying information regarding the generated clock, and to transmit the generated synchronous message to the node using an IP packet,
wherein a time calculator is configured to measure a reception interval of the synchronous message, and a clock correction processor is configured to calculate, without using the synchronous message, the clock correction value when the reception interval of the synchronous message is more than a predetermined threshold.

4. The synchronous server according to claim 3, wherein the synchronous message transmitter sets a time of transmitting the synchronous message as the information regarding the clock in the synchronous message.

5. A node in a radio access network system having a synchronous server, the node comprising:
a receiver configured to receive a synchronous message for notifying information regarding a clock generated in the synchronous server;
a time calculator configured to obtain a time of receiving the synchronous message; and
a clock correction processor configured to calculate a clock correction value in accordance with the time of receiving the synchronous message and the information regarding the clock notified by the synchronous message, and to correct a generated timing of a clock in the node in accordance with the clock correction value,
wherein the time calculator is configured to measure a reception interval of the synchronous message, and the clock correction processor is configured to calculate, without using the synchronous message, the clock correction value when the reception interval of the synchronous message is more than a predetermined threshold.

6. The node according to claim 5, the node further comprising a memory configured to associate a time of transmitting set in the synchronous message with the time of receiving the synchronous message in the node, upon receiving the synchronous message.

7. The node according to claim 6, wherein the time calculator obtains the time of transmitting the synchronous message and the time of receiving the synchronous message from the memory, calculates a transmission interval of the synchronous message and a reception interval of the synchronous message, and calculates the clock correction value in accordance with a comparison between the transmission interval and the reception interval.

* * * * *